United States Patent
Shaw

(10) Patent No.: US 8,515,934 B1
(45) Date of Patent: *Aug. 20, 2013

(54) PROVIDING PARALLEL RESOURCES IN SEARCH RESULTS

(75) Inventor: Hayden Shaw, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,290

(22) Filed: Jul. 5, 2011

Related U.S. Application Data

(63) Continuation of application No. 11/963,678, filed on Dec. 21, 2007, now Pat. No. 7,984,034.

(51) Int. Cl.
G06F 17/30 (2006.01)

(52) U.S. Cl.
USPC ........... 707/706; 707/723; 707/726; 707/728; 707/729

(58) Field of Classification Search
USPC ................................. 707/721, 726, 728–729
See application file for complete search history.

(56) References Cited

U.S. PATENT DOCUMENTS

| | | | |
|---|---|---|---|
| 6,233,545 B1 | 5/2001 | Datig | |
| 6,999,932 B1 | 2/2006 | Zhou | |
| 7,146,358 B1 * | 12/2006 | Gravano et al. | 1/1 |
| 7,447,678 B2 | 11/2008 | Taylor et al. | |
| 7,783,633 B2 * | 8/2010 | Florian et al. | 707/729 |
| 7,984,034 B1 | 7/2011 | Shaw | |
| 2002/0107847 A1 | 8/2002 | Johnson | |
| 2002/0123982 A1 | 9/2002 | Masuichi | |
| 2002/0161840 A1 | 10/2002 | Wilcox et al. | |
| 2003/0149686 A1 * | 8/2003 | Drissi et al. | 707/3 |
| 2003/0200079 A1 * | 10/2003 | Sakai | 704/8 |
| 2004/0006560 A1 * | 1/2004 | Chan et al. | 707/3 |
| 2004/0088141 A1 | 5/2004 | Ashley | |
| 2004/0102957 A1 | 5/2004 | Levin | |
| 2004/0122656 A1 * | 6/2004 | Abir | 704/4 |
| 2005/0086224 A1 | 4/2005 | Franciosa et al. | |
| 2005/0228643 A1 | 10/2005 | Munteanu et al. | |
| 2005/0289168 A1 * | 12/2005 | Green et al. | 707/101 |
| 2006/0009963 A1 | 1/2006 | Gaussier et al. | |
| 2006/0129915 A1 * | 6/2006 | Chan | 715/512 |
| 2006/0200766 A1 | 9/2006 | Lakritz | |
| 2006/0217963 A1 | 9/2006 | Masuichi et al. | |
| 2006/0259459 A1 * | 11/2006 | Wu et al. | 707/2 |
| 2007/0038985 A1 | 2/2007 | Meijer et al. | |
| 2007/0043567 A1 * | 2/2007 | Gao et al. | 704/257 |
| 2007/0192110 A1 | 8/2007 | Mizutani et al. | |
| 2008/0126076 A1 | 5/2008 | Ming et al. | |

(Continued)

OTHER PUBLICATIONS

Resnik et al., "The Web as a parallel corpus Computational Linguistics", vol. 29, Issue 3 (Sep. 2003), pp. 349-380.

*Primary Examiner* — Hanh Thai
(74) *Attorney, Agent, or Firm* — Fish & Richardson P.C.

(57) ABSTRACT

Various aspects can be implemented for providing parallel resources in search results. In general, one aspect can be a method that includes receiving a search query in a first language. The method also includes generating a search result based on the search query, the search result including a location reference to an identified resource in the first language. The method further includes identifying a parallel resource in a second language, the parallel resource including one or both of a high-quality translation of the identified resource, and an original resource originating in the second language on a similar topic as the identified resource. Other implementations of this aspect include corresponding systems, apparatus, and computer program products.

30 Claims, 7 Drawing Sheets

(56) References Cited

U.S. PATENT DOCUMENTS

| | | | |
|---|---|---|---|
| 2008/0140679 A1* | 6/2008 | Deyo et al. | 707/100 |
| 2008/0162115 A1* | 7/2008 | Fuji et al. | 704/7 |
| 2008/0189257 A1* | 8/2008 | Wiseman et al. | 707/4 |
| 2008/0262826 A1* | 10/2008 | Pacull | 704/3 |
| 2008/0262828 A1* | 10/2008 | Och et al. | 704/3 |
| 2008/0281578 A1 | 11/2008 | Kumaran et al. | |
| 2009/0024595 A1 | 1/2009 | Chen | |
| 2009/0292525 A1 | 11/2009 | Goishi | |

\* cited by examiner

PROVIDING PARALLEL RESOURCES IN SEARCH RESULTS

CROSS-REFERENCE TO RELATED APPLICATIONS

This application is a continuation (and claims the benefit under 35 U.S.C. §120) of U.S. patent application Ser. No. 11/963,678, filed Dec. 21, 2007, which is hereby incorporated by reference in its entirety.

TECHNICAL FIELD

This disclosure generally relates to providing parallel resources in search results for a search query.

BACKGROUND

The Internet is a repository of vast information. Using a search engine (e.g., the Google search engine) ordinary individuals across the globe can have unprecedented access to a wide array of information. The global nature of the Internet, however, provides special challenges as users speaking many languages seek out information. For example, because the prevalent language for communication on the Internet is English, many non-English speakers may not find relevant information in their native or preferred language.

SUMMARY

This specification describes various aspects relating to generating search results that can alert users to the presence of parallel resources, which can include, e.g., a human translation or a high-quality translation of a document, or a document originating in another language covering the same topic. Incorporating such parallel resources into search results can provide highly relevant and high-quality search results to a multilingual searcher who submits search query in a first language but prefers to receive search results in a second language. When using a search engine, these users may not be aware of the existence of a resource that closely parallels a returned search result, perhaps a literal translation of the search result.

For example, a woman with lung cancer in Japan may search the Internet for the latest reports on the disease. Suspecting a lack of resources in Japanese, she may use an English search engine and receive results pointing her to English articles. Alternative, she may perform the search using automatically translated search terms (e.g., cross lingual information retrieval), which can lead to ambiguities and poor results. Having limited proficiency in English, she will gather little useful information and end up being frustrated.

If she does find an article that looks particularly relevant to her condition, she is likely to attempt to automatically translate it to Japanese using a machine translation website. Automatically translated documents (e.g., machine translation of search results), however, can be inferior to parallel documents (e.g., human translations). Inherent limitations of machine translation are likely to result in a translation that misses many of the article's key points. By searching in English, she also may be unaware of recent reports in Japanese addressing lung cancer. Using the systems and techniques described in this disclosure, search results can be augmented by visual alerts that include, e.g., snippets and web links for relevant Japanese translations of the English articles retrieved.

In general, one aspect can be a method that includes receiving a search query in a first language. The method also includes generating a search result based on the search query, the search result including a location reference to an identified resource in the first language. The method further includes identifying a parallel resource in a second language, the parallel resource including one or both of a high-quality translation of the identified resource, and an original resource originating in the second language on a similar topic as the identified resource. Other implementations of this aspect include corresponding systems, apparatus, and computer program products.

Another general aspect can be a system that includes a resource index module configured to generate a search result based on a search query in a first language, the search result including a reference to an identified resource in the first language. The system also includes a parallel resource map module configured to relate the identified resource in the first language with a parallel resource in a second language, the parallel resource including one or both of a high-quality translation of the identified resource, and an original resource originating in the second language on a similar topic as the identified resource. The system further includes means for receiving a search query in a first language, and means for providing the parallel resource in the search result based on the search query.

These and other general aspects can optionally include one or more of the following specific aspects. The method can include generating a visual alert associated with the parallel resource, and presenting the search result and the visual alert to a query originator (e.g., a user). The method can also include translating the search query to the second language, and searching the parallel resource based on the translated search query. The method can further include extracting a relevant section of the parallel resource based on the translated search query. The method can additionally include obtaining a language preference by a query originator, and determining the second language based on the language preference. Furthermore, the method can include building a parallel resource map relating the identified resource in the first language to the parallel resource in the second language.

The high-quality translation can include a human translation or a high-quality machine translation. The step of receiving can include receiving the search query from a user via a graphical user interface. The visual alert can include a title of the parallel resource, a hyperlink of the parallel resource, and a snippet including the relevant section of the parallel resource. The step of obtaining the language preference can be based on an explicit indication by receiving a language preference setting related to search results from the query originator, or an implicit indication by inferring from a search history of the query originator or an IP address of the query originator. The step of generating the search result can include searching a first language resource index. The parallel resource map can be a part of a resource information database.

Particular aspects can be implemented to realize one or more of the following potential advantages. Many users of information retrieval search engines have a reading ability in more than one language. In general, the systems and techniques described in this disclosure can provide a richer and more productive search experience for such users. The search tool can provide search results referring to high-quality resources in a preferred language when the searcher performs a search in a different language. The search tool can achieve this by returning results in the requested search language along with alerts or notifications of parallel resources (e.g., human and high-quality, automatic translations and resources originating in the preferred language) in the user's preferred language.

The general and specific aspects can be implemented using a system, method, or a computer program, or any combination of systems, methods, and computer programs. The details of one or more implementations are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to providing search results that include parallel resources (e.g., documents or files) in a preferred language that is different from the language used to submit search queries. A user may submit a search query in a language other than her preferred language hoping to obtain the maximum amount of information on a topic of interest to her. For example, many Internet users search the Web in English but have proficiency in another language. A Spanish-speaking user may search for recent disease breakthroughs in English. The value of the search results will be far greater, however, if the user is alerted to parallel documents in Spanish. A parallel document can be a human translation or a high-quality translation of a document, or a document originating in the preferred language covering the same topic.

The user's preferred language can be determined based on an explicit indication of language preference by the user (e.g., language preference settings in an Internet browser specified by the user). The user's preferred language can also be determined implicitly using, e.g., geolocation of the user's IP address, the user's search history, or by other means. Additionally, search results can be augmented with snippets from and/or links to the parallel resources. To provide the functionality, the system can maintain an index that links parallel resources in different languages. The index can be incorporated into a main search engine index and affect the ranking of results, or be separate and used when generating search results. To ensure quality search results, potential parallel resources can be scored on parallelism/similarity, source reliability, and other factors.

Figure 1:
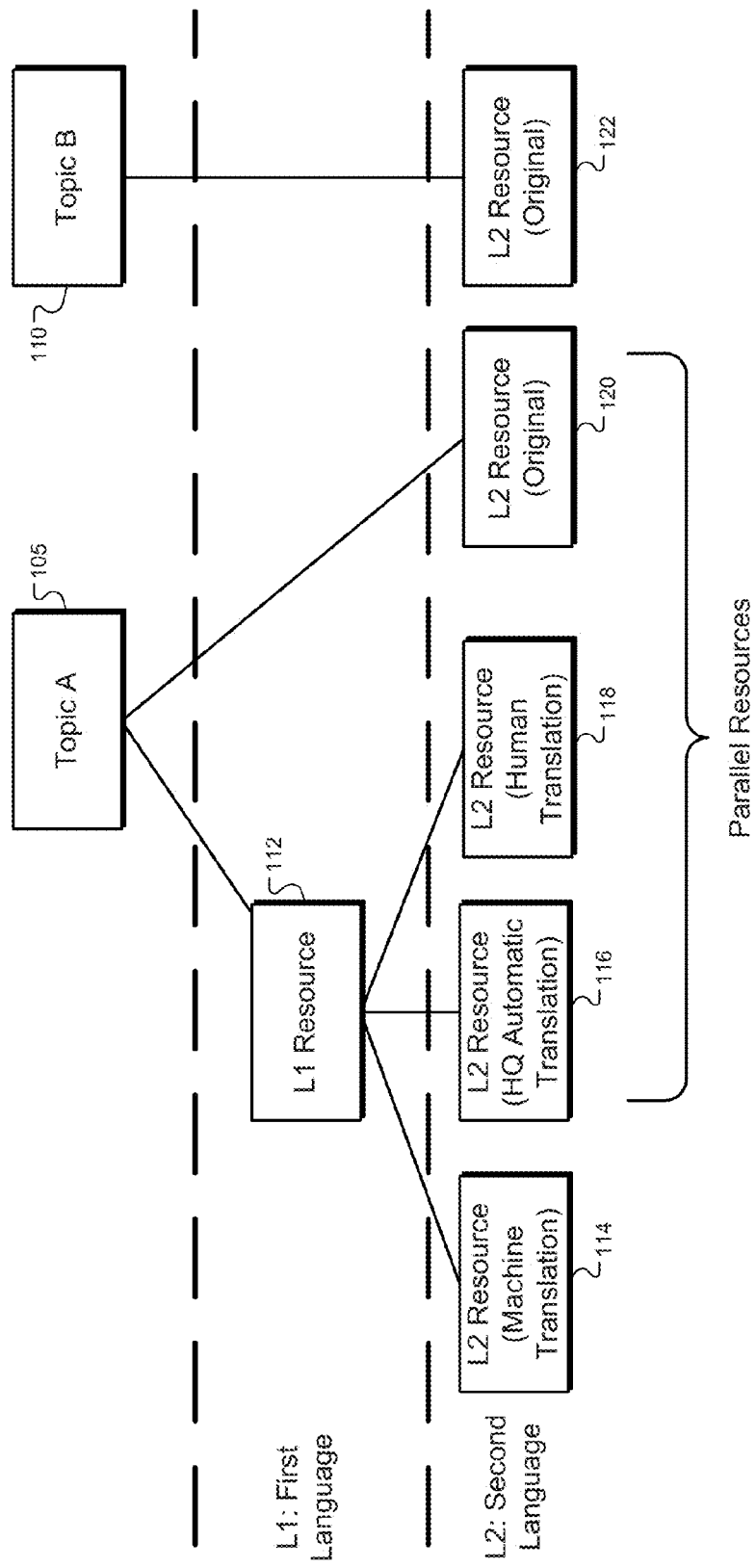
FIG. 1 is a diagram showing a concept of parallel resources.

FIG. 1 is a diagram showing the concept of parallel resources. In general, for a given topic of interest (which can be, e.g., a text string used in a search query, e.g., "lung cancer," or a text string related to a news event), parallel resources in a second language (L2) that are associated with a resource in a first language (L1) can be provided in a search result. As used herein, a resource can include a document, a file and the like or, more generally, any source of information that may be helpful to a user. For example, a resource can include various types of documents, such as HTML documents, PDF documents, Microsoft Word documents, XML documents, and the like. Additionally, a resource can include various types of files, such as Microsoft PowerPoint files, image files (e.g., language-specific captions or images of text), audio files, video files, and the like.

As shown in FIG. 1, various resources can be related to different topics of interest. For example, five different resources (Resources 112, 114, 116, 118, and 120) are related to Topic A 105; and one resource (Resource 122) is related to Topic B 110. Resource 112 is a resource in a first language (e.g., English, Chinese, or French), and Resources 114, 116, 118, 120, and 122 are all resources in a second language (e.g., Spanish, Hindi, and Arabic). The first language is different from the second language. Additionally, the second language can be the preferred language for a user, even though the user may submit search queries in the first language.

For example, suppose that a user, who is proficient in both the first language and the second language, is interested in finding resources related to Topic A 105, and submits a search query in the first language. Conventional search engines would typically return only search results in the first language, which includes Resource 112. In addition to Resource 112, however, parallel resources (e.g., Resources 116, 118, and 120) in the second language can be provided by identifying the second language as the preferred language of the user. Details of how the preferred language can be determined will be described below.

Resource 114 is a second-language machine translation (e.g., a translation performed by an Internet-based website) of Resource 112, which is a resource presented in the first language. Resource 116 is a second-language high-quality automatic translation of Resource 112. A high-quality automatic translation can include a translation performed by software or machine (e.g., using neural network, artificial intelligence, or statistical language translation) that is superior to a lower-quality machine translation 114. A high-quality automatic translation can require a larger amount of computing power, more time and extensive data resources to translate relative to a conventional machine translation.

Resource 118 is a second-language human translation of Resource 112, which is a resource presented in the first language. Human translations from one language to another can often be the highest quality translations available. Resource 120 is an original resource (e.g., an independently written article covering the same news event, as opposed to a translated resource) presented in the second language. Resource 120 covers or relates to Topic A 105, as does Resource 112. Human translations (e.g., Resource 118), high-quality automatic translations (e.g., Resource 116), and original resources on the same topic (e.g., Resource 120), can all be parallel resources of Resource 112.

On the other hand, machine translation (e.g., Resource 114), while relates to Topic A 105, is not a parallel resource of Resource 112 due to the lack of quality in the translation. Additionally, resources that are not related to Topic A 105 are also not parallel resources of Resource 112. For example, Resource 122, which is an original resource presented in the second language and likely being of high quality, is not a parallel resource of Resource 112 because Resource 122 relates to Topic B 110 rather than Topic A 105. In this manner, for a given topic of interest, parallel resources in a second language that are associated with a resource in a first language can be provided in a search result.

Figure 2:
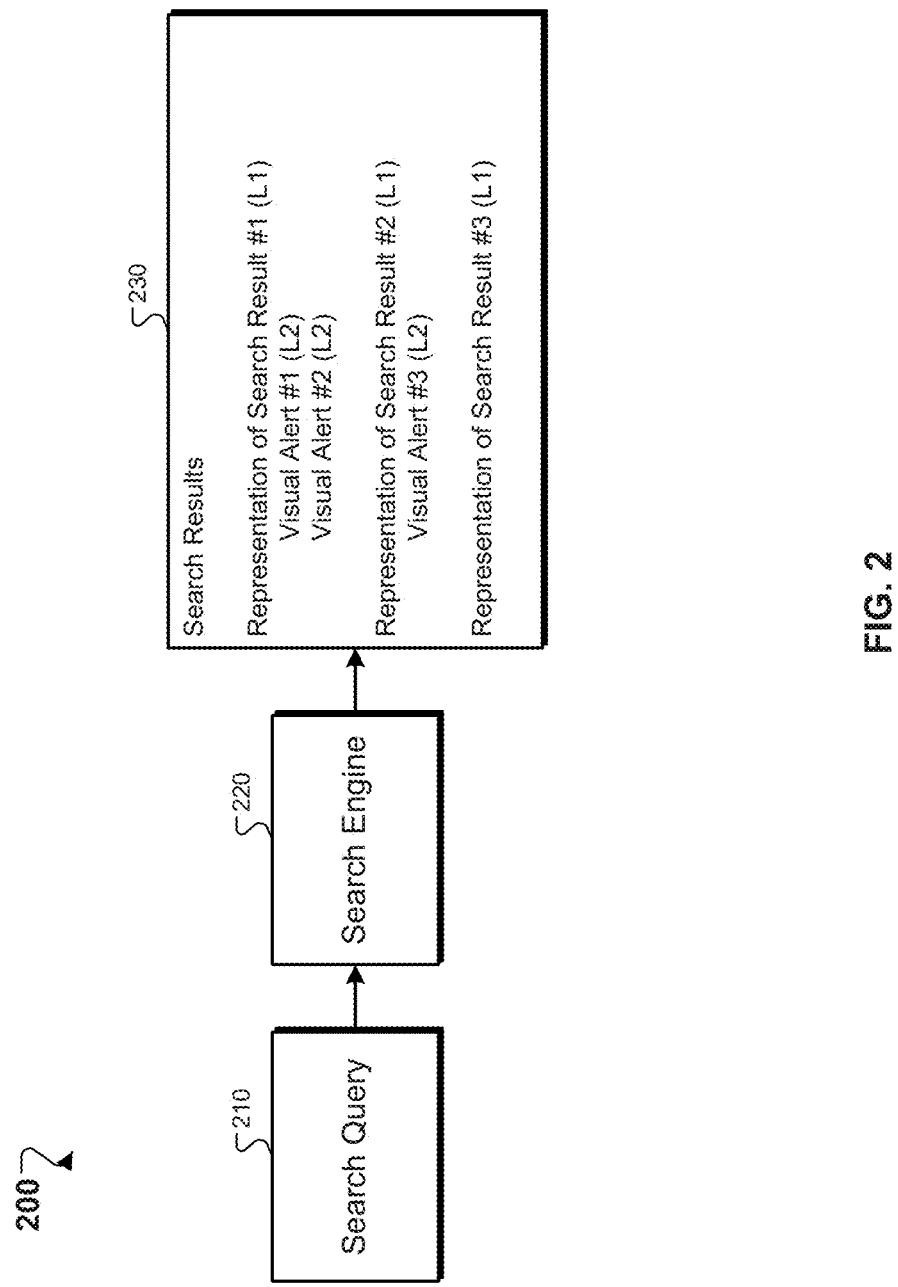
FIG. 2 is a conceptual diagram of generating search results.

FIG. 2 is a conceptual diagram 400 of generating search results. Diagram 400 shows a functional example of how parallel resources can be obtained based on a search query 210. Search query 210 is in the first language and is received by search engine 220. Search engine 220 can receive query 210 through submission of data on the Internet or other network, by receipt of a machine to machine communication, or other means known for receiving data. Search engine 220 performs operations producing search results 230 relating to search query 210. These operations performed by search engine 220 can include searching indexes, databases, files, neural networks or other searching tools. Search results 230 are one or more results relating to the search query 210 and, in part, refer to resources.

Search results of the search engine 220 can be information visually displayed on a graphical user interface or data communicated from machine to machine (e.g., XML). Search results 230 illustrate an example in which the results are visually displayed. As shown in the search results 230, representations of search results #1, #2 and #3 are in the first language and refer to resources 105 in the first language. Visual alerts #1, #2 and #3 refer to one or more parallel resources 150 in the second language.

In addition, search results can be ranked based on their relevance to the topic of interest or the number of parallel resources available. In the example shown in search results 230, the number of parallel resources available is used to rank the search results. For example, search result #1 has two visual alerts #1 and #2 pointing to related parallel resources. Therefore, search result #1 was returned higher in the list of search results 146 than search result #2 and #3, which have fewer related parallel resources.

Figure 3:
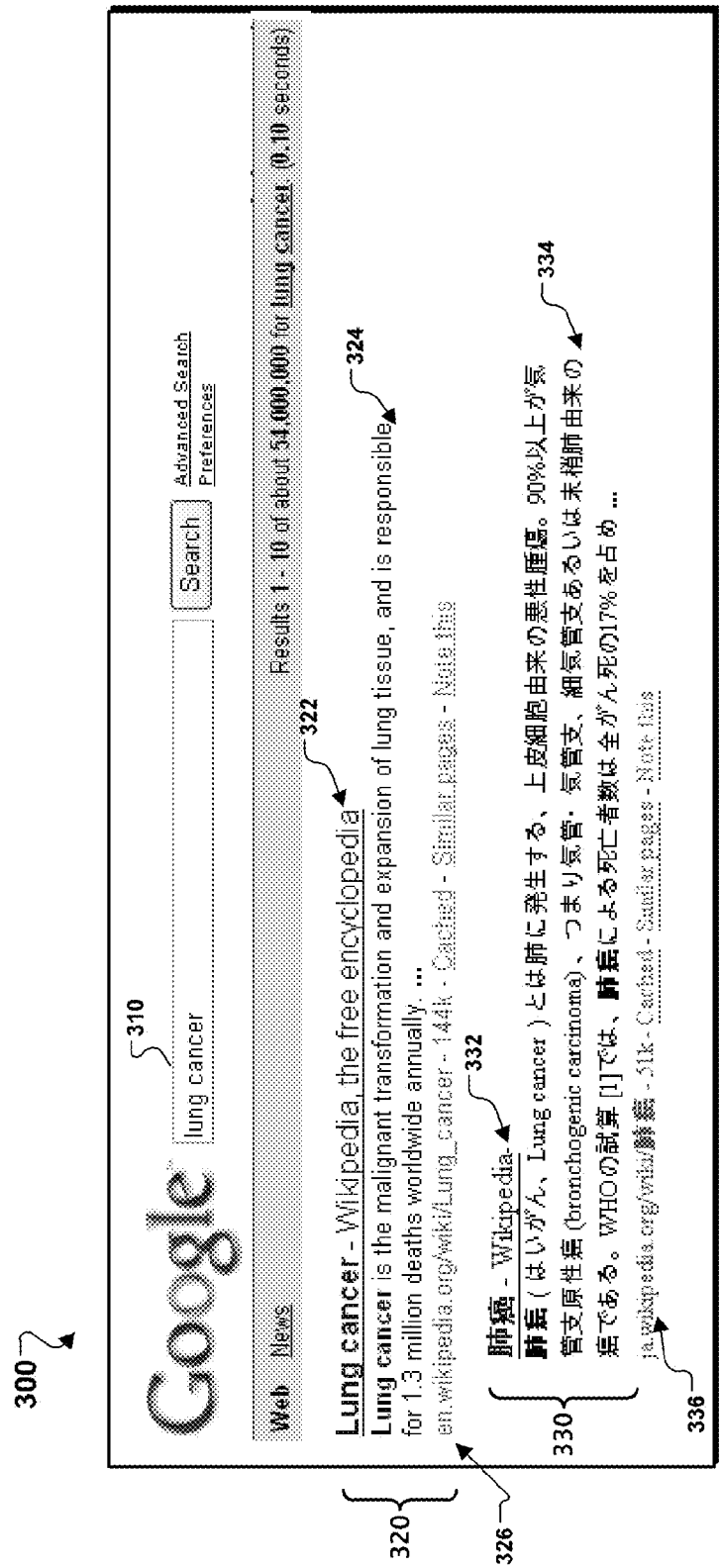
FIG. 3 is an exemplary graphical user interface of a search result with parallel resources.

FIG. 3 is an exemplary graphical user interface (GUI) 300 of a search result with parallel resources. GUI 300 can be, e.g., a Web browser displaying a website, a mobile device (e.g., cell phone, PDA) displaying an interface, a textual interface, such as through a command-line application, or other visual interface. The interface to the search engine can also be computer-to-computer (e.g., XML), an audible interface (e.g., for the sight impaired), or other non-visual interface. GUI 300 can include a search query entry box 310 for receiving search queries.

After a query originator (e.g., a user, a computer, or other devices) submits a search query, GUI 300 displays a search result 320 in a first language and a visual alert 330 of a parallel resource in a preferred, second language. Search result 320 (in English) can include, by way of example, a title 322 of the resource, a snippet 324 showing some relevant passage from the resource, and a uniform resource locator (URL) 326 of the resource. Likewise, visual alert 320 (in Japanese) can include a title 332 of a parallel resource, a snippet 334 of the parallel resource, and the URL 336 of the parallel resource.

Snippet 334 can include one or more relevant sections of content from the parallel resource relating to the search query. Among other things, snippet 334 can help the query originator understand the context in which terms from the search query are used in the parallel resource. The query originator can access the parallel resource directly by entering the URL 336 in a web browser, clicking on a link to URL 336, or by other access techniques.

Figure 4:
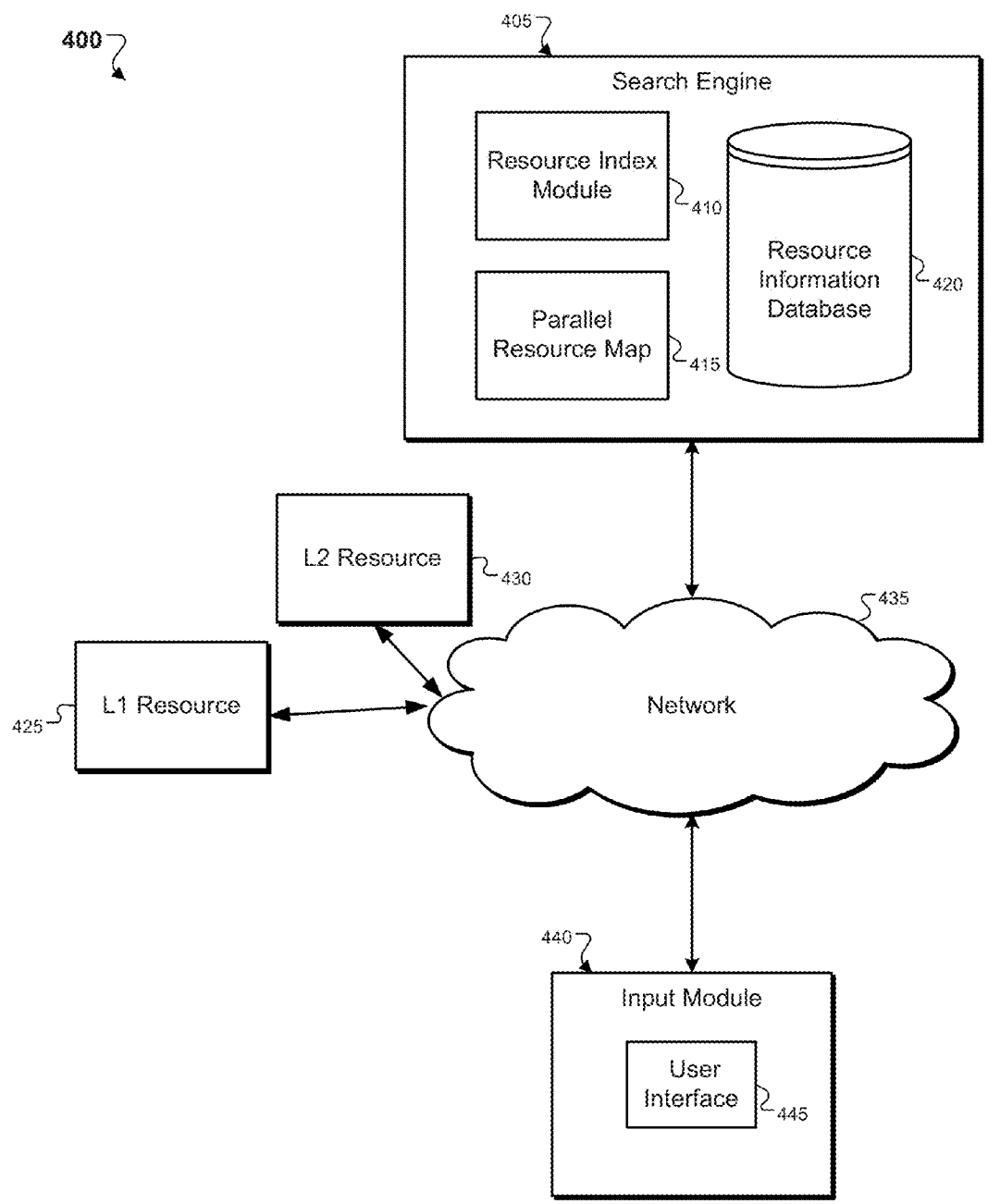
FIG. 4 is a schematic diagram of a system for providing parallel resources in search results.

FIG. 4 is a schematic diagram of a system 400 that provides parallel resources in search results. In general, system 400 can receive search queries in a first language and provide search results that include resources in the first language and parallel resources in a second language. The methods, processes, engines, apparatuses, computer program products, systems and the like discussed below can be applicable to an Internet website environment and other network environments including intranet, local area network, wide area network, virtual private network, ad hoc network, private network and the like.

Resources can be indexed for system 400 in several ways, e.g., clustered or non-clustered, using different index types, e.g., bitmap, sparse, or dense. Resources for system 400 can include various media, e.g., HTML documents, PDF documents, Microsoft PowerPoint files, Microsoft Word documents, XML documents, image files (e.g., language-specific captions or images of text), audio files and videos. References to resources for system 400 can include various types, e.g., URL's, IP addresses, call numbers, directory paths, and file names. Resources can be accessible through the network in different ways, e.g., on an Internet or intranet website, a network accessible HTTP or FTP server, and a file or peer-to-peer file sharing system. The network for system 400 can be accessed in various ways, e.g., though an Internet connection, wireless or wired network connection, and via mobile devices.

As shown in FIG. 4, system 400 includes a search engine 405, which can include, e.g., Google search engine. Search engine 405 includes a resource index module 410, a parallel resource map 415, and a resource information database 420. The resource information database 420 can record, for each resource known to the search engine, the location of the resource, the language of the resource, and other information about the resource (e.g. quality measures such as PageRank) that are known in the art of information retrieval. The record for a resource can be accessed by a unique identifier for the resource, such as the location of the resource, a binary code derived from the location, or some other scheme for numbering resources.

The resource index module 410 can be the normal search index module known to the art in information retrieval, which can include an inverted index (consisting of posting lists that list the identifiers for resources that contain each possible search term). In one implementation, given a unique identifier for each L1 resource 425, the parallel resource map 415 can associate another unique identifier of a parallel L2 resource 430, or more generally a list of parallel resource identifiers (which may be in L2 as well as other languages). In an alternative implementation, there is no separate parallel resource map 415, but instead an entry for an L1 resource in the resource information database 420 can include the identifier of a parallel L2 resource, or more generally a list of parallel resource identifiers (which may be in L2 and other languages).

Search engine 405 can access L1 Resource 425 and L2 Resource 430 via network 435. Network 435 can include any network, such as a local area network, metropolitan area network, wide area network, a wired or wireless network, a private network, or a virtual private network. Input module 440 can interface with search engine 405 via network 435 and allow a user to submit search queries. In this example, input module 440 includes user interface 445, which can be, e.g., a graphical, textual, auditory, or tactile user interface, such as an Internet browser or a mobile device interface. In other implementations, input module 440 may not include user interface 445 because it can be, e.g., a machine operating without direct user involvement, such as a server.

Search engine 405 can be used by input module 440 to produce search results in response to a search query. In one implementation, search engine 405 can use resource index module 410 to perform an index lookup relating to the search query and generate search results including a reference to L1 resource 425. Search engine 405 can separately use parallel resource map 415 to perform an index lookup based on the search results from resource index module 410 and generate information related to L2 resource 430 including a reference to L2 resource 430. As noted above, in another implementation, parallel resource map 415 can be combined with the resource information database 420.

Figure 5:
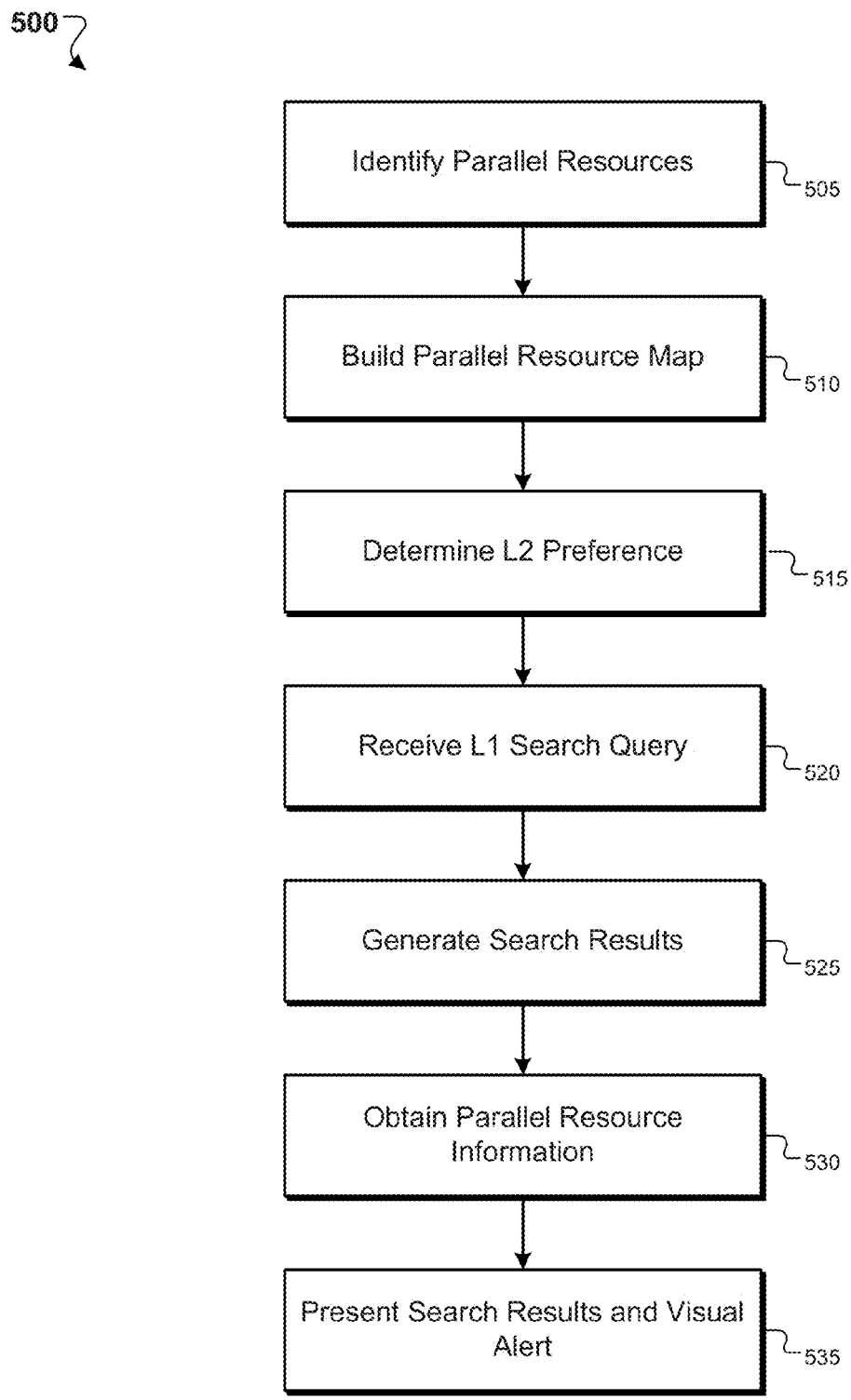
FIG. 5 is a flow chart illustrating a process for generating a search result with parallel resources.

FIG. 5 is a flow chart illustrating a process 500 for providing parallel resources in search results. In general, the illustrated process involves identifying parallel resources and building a parallel resource map based on the identified parallel resources. Additionally, the process involves receiving search queries and generating search results that include relevant parallel resources. In this manner, the illustrated process can provide search results that include parallel resources (e.g., documents or files) in a preferred language in response to search queries submitted in a language different from the preferred language.

In this example implementation, process 500, at 505, identifies parallel resources for a second language (L2) different from a first language (L1) used in the search query. As noted above, parallel resources can be documents that are literal translations of each other, non-literal translations, or even documents covering the same material (e.g. independently written articles covering the same news event.) Well-known methods for identifying parallel documents can be used. For example, one method is used for pairing web documents for the purpose of training statistical machine translation systems.

At 510, process 500 builds a parallel resource map based on the identified parallel resources. As described above in FIG. 4, in one implementation, given a unique identifier for each L1 resource, the parallel resource map can associate another unique identifier of a parallel L2 resource, or more generally a list of parallel resource identifiers (which may be in L2 as well as other languages). In an alternative implementation, the parallel resource map can be a part of the resource information database. In this manner, an entry for an L1 resource in the resource information database can also include the identifier of a parallel L2 resource, or more generally a list of parallel resource identifiers (which may be in L2 and other languages).

Process 500, at 515, determines a language preference for the second language, L2. The language preference can be determined based on an explicit indication of a language preference by the user (e.g., language preference settings in an Internet browser specified by the user). The language preference can also be determined implicitly using, e.g., geolocation of the user's IP address, the user's search history, or by other means. For example, techniques such as trilateration or triangulation of wireless signals (e.g., WiFi or cellular signals) can be used to determine a user's location. Furthermore, the user's language preference can be inferred based on the user's location.

Process 500, at 520, receives a search query in the first language, L1. In one implementation, process 500 can receive the search query through submission of data from a user on the Internet or other network. In another implementation, process 500 can receive the search query through a machine to machine communication. For example, referring back to FIG. 3, process 500 can receive the search query, "lung cancer," entered by the user through the graphical interface 182.

After receiving a search query in the first language, process 500, at 525, generates search results in the first language. In one implementation the search results can be generated using well-known information retrieval methods. In some implementations, process 500 can generate a ranking of results that includes a scoring factor that gives additional weight to L1 documents for which at least one parallel L2 document is present in the parallel resource index. For example, referring back to FIG. 2, the search results were generated based on the number of parallel resources available. For example, search result #1 has two visual alerts #1 and #2 pointing to related parallel resources. Therefore, search result #1 was returned higher in the list of search results than search results #2 and #3, which have fewer related parallel resources.

Process 500, at 530, obtains parallel resource information to be included in the search results. As described above, parallel resource information can include, e.g., title and the URL of the resource. Additionally, parallel resource information can be represented by visual alerts that include snippets. Details of how the visual alerts can be generated will be discussed further below. In one implementation, a snippet can include one or more short sections of content from the parallel resource relating to the search query. In addition, the snippet can help the query originator (e.g., the user) understand the context in which terms from the search query are used in the parallel resource. For example, referring again back to FIG. 3, after receiving a search query of "lung cancer," process 500 can obtain a parallel resource information of a Japanese document relevance to the search result.

After obtaining information on parallel resources, process 500, at 535, presents the search results and visual alerts of the parallel resources, e.g., in a graphical user interface such as a Internet search engine. As discussed above, the search results of the search query are presented in a first language and the visual alerts are presented in a second language, different from the first language. Potentially there can be a number of parallel resources associated with a search result. In one implementation, a ranking system for the parallel resources can include a scoring factor based on the degree of parallelism and the reliability of the publication source. For example, if a parallel resource is generated by a reputable publication source, then that parallel resource can be ranked higher than a parallel resource from a less reputable publication.

In this manner, process 500 can provide search results that include parallel resources (e.g., documents or files) in a preferred language in response to search queries submitted in a different language from the preferred language. In one example, suppose that a Spanish-speaking Internet user performs a search in English hoping to get more results than searching in Spanish. The user has limited proficiency in English and has performed some prior searches in Spanish. In addition, the user has set the user interface to display in Spanish despite requesting English results. The user also lives, as identified by the IP address of her computer, in a part of the world where Spanish is the predominant language.

The search engine while returning English results, takes account of the language cues, and includes parallel search results in Spanish as well. The Spanish search results refer to human translations of the English results. The user is able to see short sections of the Spanish documents along with links and titles. From the short sections, the user realizes the translations are of high quality and rather than pursuing one of the English results, clicks on one of the Spanish results. The satisfied user now has a resource in her preferred language covering her desired topic.

Figure 6:
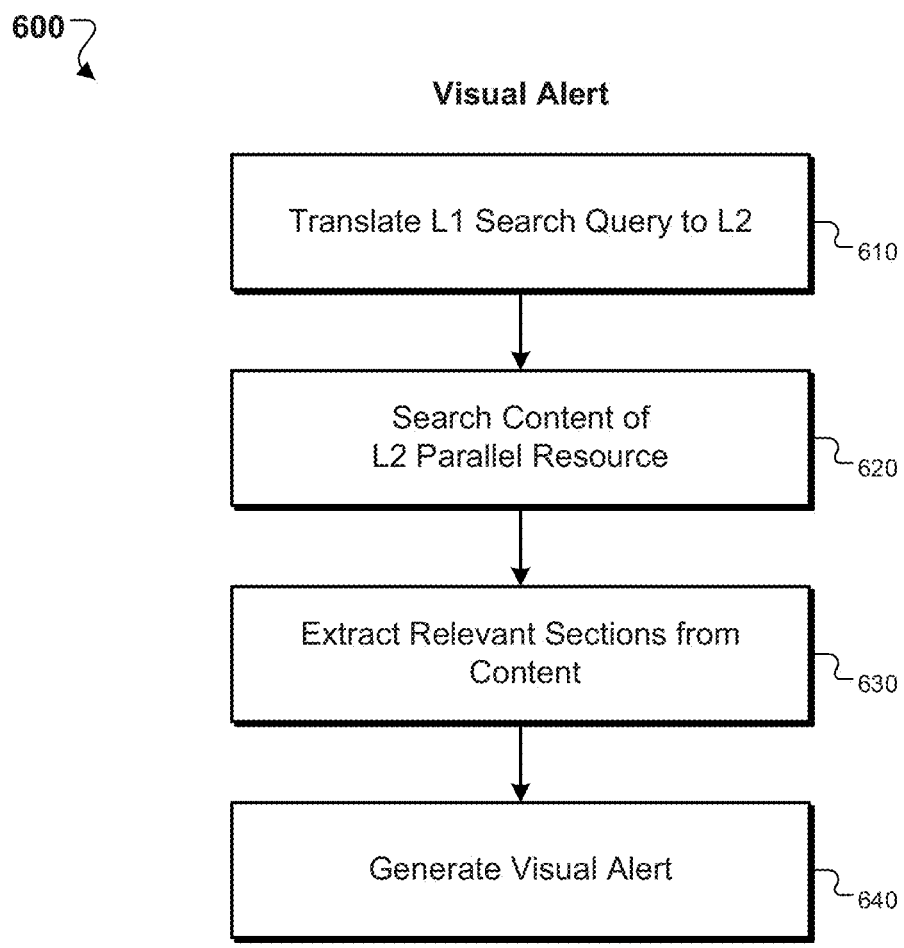
FIG. 6 is a flow chart illustrating a process for generating visual alerts of parallel resources.

FIG. 6 is a flow chart illustrating a process 600 for generating a visual alert of a parallel resource. In general, once the existence of a parallel resource has been identified, the illustrated process involves translating the search query from the first language (L1) into the second language (L2). Additionally, the process involves searching through the content of the identified L2 parallel resource and extracting relevant sections from the content of the parallel resource. In this manner, the illustrated process can provide visual alerts that includes snippets (in the second language) associated with search results in the first language.

In this example implementation, process 600, at 610, translates the search query from the first language (L1) into the second language (L2). For example, suppose that the search query is "lung cancer," process 600 can translate the search query from English into the preferred second language, e.g., Spanish, Chinese, or Japanese.

After translating the search query into the second language, process 600, at 620, searches the content of the L2 parallel resource for information relevant to the search query. For example, suppose that the L2 parallel resource is a Spanish medical publication on the latest cancer research, process 600, can search the Spanish medical publication and identify every instance where the term "lung cancer" (in Spanish) appears in the publication.

Once the relevant sections in the L2 parallel resource have been identified, at 630, process 600 extracts these relevant sections from the L2 parallel resource and present them as snippets or visual alerts of the L2 parallel resource. For example, referring back to FIG. 3, the search result presents a Japanese visual alert 330 that includes a title 332 of a parallel resource, a snippet 334 of the parallel resource and the URL 336 of the parallel resource. Additionally, as shown in FIG. 3, the translated search query in Japanese has been shown as bold letters in snippet 334.

Figure 7:
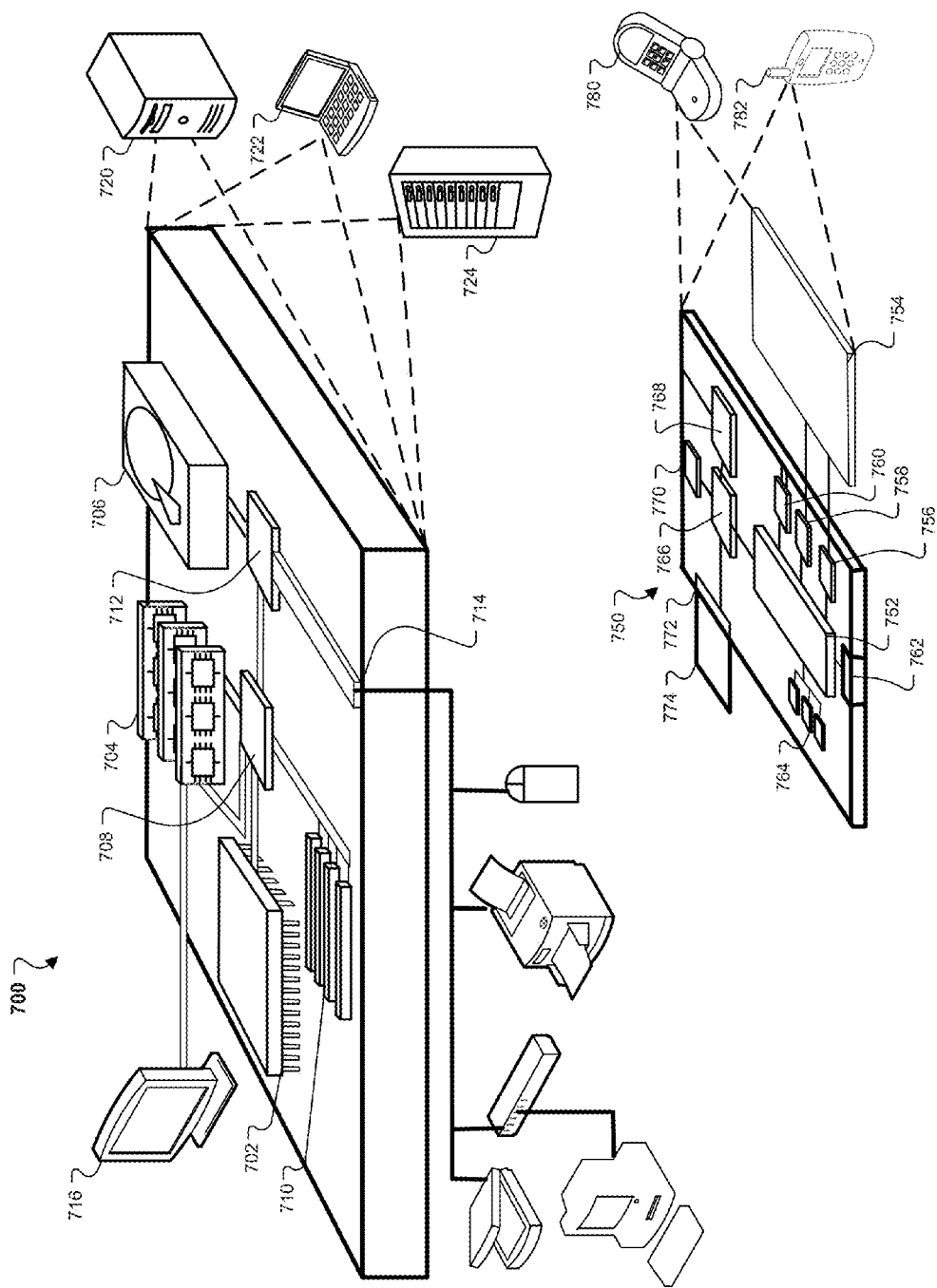
FIG. 7 is a block diagram of a computing device and system used to provide parallel resources in search results.

FIG. 7 is a block diagram of a computing device and system that can be used to generate search results. Computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which can accept various expansion cards (not shown). In the implementation, low-speed controller 712 is coupled to storage device 706 and low-speed expansion port 714. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

Computing device 750 includes a processor 752, memory 764, an input/output device such as a display 754, a communication interface 766, and a transceiver 768, among other components. The device 750 can also be provided with a storage device, such as a microdrive or other device, to provide additional storage. Each of the components 750, 752, 764, 754, 766, and 768, are interconnected using various buses, and several of the components can be mounted on a common motherboard or in other manners as appropriate.

The processor 752 can process instructions for execution within the computing device 750, including instructions stored in the memory 764. The processor can also include separate analog and digital processors. The processor can provide, for example, for coordination of the other components of the device 750, such as control of user interfaces, applications run by device 750, and wireless communication by device 750.

Processor 752 can communicate with a user through control interface 758 and display interface 756 coupled to a display 754. The display 754 can be, for example, a TFT LCD display or an OLED display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can be provide in communication with processor 752, so as to enable near area communication of device 750 with other devices. External interface 762 can provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 can also be provided and connected to device 750 through expansion interface 772, which can include, for example, a SIMM card interface. Such expansion memory 774 can provide extra storage space for device 750, or can also store applications or other information for device 750. Specifically, expansion memory 774 can include instructions to carry out or supplement the processes described above, and can include secure information also. Thus, for example, expansion memory 774 can be provide as a security module for device 750, and can be programmed with instructions that permit secure use of device 750. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 can communicate wirelessly through communication interface 766, which can include digital signal processing circuitry where necessary. Communication interface 766 can provide for communications under various modes or protocols, such as GSM voice calls, SMS, EMS, or MMS messaging, CDMA, TDMA, PDC, WCDMA, CDMA4000, or GPRS, among others. Such communication can occur, for example, through radio-frequency transceiver 768. In addition, short-range communication can occur, such as using a Bluetooth, WiFi, or other such transceiver (not shown). In addition, GPS receiver module 770 can provide additional wireless data to device 750, which can be used as appropriate by applications running on device 750.

Device 750 can also communication audibly using audio codec 760, which can receive spoken information from a user and convert it to usable digital information. Audio codex 760 can likewise generate audible sound for a user, such as through a speaker, e.g., in a handset of device 750. Such sound can include sound from voice telephone calls, can include recorded sound (e.g., voice messages, music files, etc.) and can also include sound generated by applications operating on device 750.

The computing device 750 can be implemented in a number of different forms, as shown in the figure. For example, it can be implemented as a cellular telephone 780. It can also be implemented as part of a smartphone 782, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it is understood that various modifications can be made without departing from the spirit and scope of the described implementations. For example, instead of using a bilingual repository, an alternative implementation can use the cross lingual information retrieval method to first find documents for a translated version of the query words and then check whether the retrieved L2 documents appear to be translations of any retrieved L1 documents. This approach, however, can have the possibility of missing documents because of query translation ambiguities, and can be much more resource intensive at search time.

In addition to a human language (e.g., Chinese, English, Spanish, Hindi, and Arabic), the language described in this disclosure can also include machine language (e.g., assembly and compiled program code), programming language (e.g., C, Windows, Java and PHP) or other type of language. The second language can be a corresponding type of language. For instance, if a resource in a first language is a document in a human language (e.g., English), the second language would also be a human language (e.g., Dutch).

Furthermore, the techniques of the present disclosure can be applicable to search queries submitted using an XML interface. For example, suppose that a scientist from the Netherlands publishes a Dutch article on the Internet covering his pharmaceutical research. A US-pharmaceutical company subscribes to a search service. Their server periodically performs searches using an XML interface to the service. A program stores the results in a database and formats them in an email to send to marketing employees. In order to stay aware of the Dutch pharmaceutical industry, the US company performs searches requesting Dutch results. Shortly after publication of the Dutch article, the US National Institute of Health finds human translation of the article to English and posts it on the Internet.

While building the parallel resource index, the search service records the relationship between the article and translation. When the next Dutch search is performed, the search service recognizes the location of the US company and returns a notice referring to the English translation with the reference to the original Dutch article. Because of existence of the human translation, the Dutch article appeared near the top of the search results. Consequently, the marketing staff noticed the article and translation, reads it and received a business advantage. Accordingly, other implementations are within the scope of the following claims.

What is claimed is:

1. A computer-implemented method comprising:
receiving a search query in a first language;
receiving a plurality of search results responsive to the search query, wherein the search results comprise one or more first search results and a plurality of second search results, wherein each first result identifies a respective document in the first language and a corresponding respective document in a different second language, and wherein the second search results each identify a respective document in the first language;
ordering the search results based on, at least, a respective number of documents identified by each of the search results; and
providing the ordered search results in response to the search query.

2. The method of claim 1 wherein a particular document in the second language is a translation of the corresponding document in the first language.

3. The method of claim 1 wherein a particular document in the second language is a document originating in the second language concerning a topic similar to a topic of the corresponding document in the first language.

4. The method of claim 1, further comprising:
translating the search query to the second language; and
identifying a particular document in the second language by searching using the translated query.

5. The method of claim 1, further comprising generating a visual alert for a particular first search result wherein the visual alert includes a snippet for the particular first search result's document in the second language.

6. The method of claim 5 wherein the visual alert comprises a title of the first search result's document in the second language or a link to first search result's document in the second language.

7. The method of claim 1, further comprising:
obtaining a language preference for a query originator; and
determining the second language based on the language preference.

8. The method of claim 7 wherein the language preference is determined based on an explicit indication of a language preference.

9. The method of claim 7 wherein the language preference is determined based on an implicit language preference.

10. The method of claim 1 wherein receiving the search results comprises searching one or more first language document indexes.

11. A machine-readable storage device comprising a computer program product, the computer program product including instructions which, when executed by data processing apparatus, cause the data processing apparatus to perform operations comprising:
receiving a search query in a first language;
receiving a plurality of search results responsive to the search query, wherein the search results comprise one or more first search results and a plurality of second search results, wherein each first result identifies a respective document in the first language and a corresponding respective document in a different second language, and wherein the second search results each identify a respective document in the first language;
ordering the search results based on, at least, a respective number of documents identified by each of the search results; and
providing the ordered search results in response to the search query.

12. The storage device of claim 11 wherein a particular document in the second language is a translation of the corresponding document in the first language.

13. The storage device of claim 11 wherein a particular document in the second language is a document originating in the second language concerning a topic similar to a topic of the corresponding document in the first language.

14. The storage device of claim 11, wherein the operations further comprise:
translating the search query to the second language; and identifying a particular document in the second language by searching using the translated query.

15. The storage device of claim 11, wherein the operations further comprise generating a visual alert for a particular first search result wherein the visual alert includes a snippet for the particular first search result's document in the second language.

16. The storage device of claim 15 wherein the visual alert comprises a title of the first search result's document in the second language or a link to first search result's document in the second language.

17. The storage device of claim 11, wherein the operations further comprise:
obtaining a language preference for a query originator; and
determining the second language based on the language preference.

18. The storage device of claim 17 wherein the language preference is determined based on an explicit indication of a language preference.

19. The storage device of claim 17 wherein the language preference is determined based on an implicit language preference.

20. The storage device of claim 11 wherein receiving the search results comprises searching one or more first language document indexes.

21. A system comprising:
a storage medium having instructions stored thereon; and
data processing apparatus programmed to execute the instructions to perform operations comprising:
receiving a search query in a first language;
receiving a plurality of search results responsive to the search query, wherein the search results comprise one or more first search results and a plurality of second search results, wherein each first result identifies a respective document in the first language and a corresponding respective document in a different second language, and wherein the second search results each identify a respective document in the first language;
ordering the search results based on, at least, a respective number of documents identified by each of the search results; and
providing the ordered search results in response to the search query.

22. The system of claim 21 wherein a particular document in the second language is a translation of the corresponding document in the first language.

23. The system of claim 21 wherein a particular document in the second language is a document originating in the second language concerning a topic similar to a topic of the corresponding document in the first language.

24. The system of claim 21, wherein the operations further comprise:
translating the search query to the second language; and
identifying a particular document in the second language by searching using the translated query.

25. The system of claim 21, wherein the operations further comprise generating a visual alert for a particular first search result wherein the visual alert includes a snippet for the particular first search result's document in the second language.

26. The system of claim 25 wherein the visual alert comprises a title of the first search result's document in the second language or a link to first search result's document in the second language.

27. The system of claim 21, wherein the operations further comprise:
obtaining a language preference for a query originator; and
determining the second language based on the language preference.

28. The system of claim 27 wherein the language preference is determined based on an explicit indication of a language preference.

29. The system of claim 27 wherein the language preference is determined based on an implicit language preference.

30. The system of claim 21 wherein receiving the search results comprises searching one or more first language document indexes.

* * * * *